United States Patent
Shukla et al.

(10) Patent No.: US 10,750,001 B2
(45) Date of Patent: *Aug. 18, 2020

(54) CONTACT-NOTE APPLICATION AND SERVICES

(71) Applicant: Microsoft Technology Licensing, LLC, Redmond, WA (US)

(72) Inventors: Swadheen Shukla, Hyderabad (IN); Anurag Rao, Hyderabad (IN); Bijoy Raveendran, Hyderabad (IN); Paramveer Singh Sisodia, Hyderabad (IN); Netal Gupta, Hyderabad (IN); Jagdish Singh, Hyderabad (IN); Anubhav Mehendru, Hyderabad (IN); Pankaj Aher, Hyderabad (IN); Sejal Sharma, Hyderabad (IN); Anish Chandran, Hyderabad (IN); Mahesh Sridharan, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,100

(22) Filed: Dec. 5, 2019

(65) Prior Publication Data
US 2020/0112630 A1  Apr. 9, 2020

Related U.S. Application Data

(63) Continuation of application No. 15/373,029, filed on Dec. 8, 2016, now Pat. No. 10,536,569.

(30) Foreign Application Priority Data

Dec. 17, 2015  (IN) ............................ 6751/CHE/2015

(51) Int. Cl.
*H04M 1/27453* (2020.01)
*H04M 1/57* (2006.01)
(Continued)

(52) U.S. Cl.
CPC ....... *H04M 1/27453* (2020.01); *H04M 1/575* (2013.01); *H04M 1/72522* (2013.01);
(Continued)

(58) Field of Classification Search
CPC ............. H04M 3/42068; H04M 1/575; H04M 3/42042; H04M 1/72522; G06F 17/24
See application file for complete search history.

(56) References Cited

U.S. PATENT DOCUMENTS 6,760,727 B1 * 7/2004 Schroeder .............. G06Q 30/02
7,502,606 B2 * 3/2009 Flynt ................... H04M 1/2745
455/403

(Continued)

*Primary Examiner* — Asghar H Bilgrami

(57) ABSTRACT

A contact-note application is disclosed herein that runs in a computing device. When a phone call event occurs, the contact-note application is notified and responsively surfaces a prompt over a user interface to a phone call application. When the prompt is selected, the contact-note application surfaces a user interface to the contact-note application. The user interface provides the end-user with a view of a note associated with a contact on the phone call such that they user may create, edit, and consume the note.

20 Claims, 19 Drawing Sheets

(51) Int. Cl.
*H04M 3/42* (2006.01)
*H04M 1/725* (2006.01)
*G06F 1/00* (2006.01)

(52) U.S. Cl.
CPC .... *H04M 3/42042* (2013.01); *H04M 1/72547* (2013.01); *H04M 1/72566* (2013.01); *H04M 1/72583* (2013.01); *H04M 3/42068* (2013.01); *H04M 2201/38* (2013.01); *H04M 2203/2038* (2013.01); *H04M 2250/22* (2013.01); *H04M 2250/68* (2013.01)

(56) References Cited

U.S. PATENT DOCUMENTS

| | | | |
|---|---|---|---|
| 9,344,850 B2* | 5/2016 | Sheha | H04M 1/274583 |
| 2009/0282005 A1* | 11/2009 | Kim | G06F 21/6218 |
| 2011/0159854 A1* | 6/2011 | Kedefors | H04L 51/16 |
| | | | 455/414.1 |
| 2012/0150789 A1* | 6/2012 | Jhoney | G06Q 10/06311 |
| | | | 706/52 |
| 2013/0159386 A1* | 6/2013 | Fan | G06Q 10/00 |
| | | | 709/203 |
| 2014/0018049 A1* | 1/2014 | Cannon | H04W 4/16 |
| | | | 455/414.1 |
| 2015/0088706 A1* | 3/2015 | Roark | G06Q 40/02 |
| | | | 705/30 |
| 2015/0127396 A1* | 5/2015 | Sheldon | G06Q 10/06311 |
| | | | 705/7.13 |
| 2015/0135096 A1* | 5/2015 | Dhara | H04L 65/403 |
| | | | 715/753 |
| 2016/0173683 A1* | 6/2016 | Abreu | H04L 51/24 |
| | | | 455/414.1 |
| 2016/0259497 A1* | 9/2016 | Foss | G06F 3/0482 |
| 2017/0104862 A1* | 4/2017 | Woloshyn | G06F 3/0488 |

* cited by examiner

CONTACT-NOTE APPLICATION AND SERVICES

CROSS REFERENCE TO RELATED APPLICATIONS

This application is a continuation of U.S. patent application Ser. No. 15/373,029, filed on Dec. 8, 2016 and entitled "CONTACT-NOTE APPLICATION AND SERVICES," which claims priority to and benefit from Indian Patent Application No. 6751/CHE/2015, filed on Dec. 17, 2015, by the same title, all of which are expressly incorporated by reference herein.

TECHNICAL BACKGROUND

Contact applications on mobile communication devices allows end-users to store phone numbers, email addresses, and other useful information in contacts that generally represent people with whom they communicate. Sharing contacts with other users is feasible on most mobile devices and provides a quick way to transfer a name and phone number from one end-user to another.

Some contact applications include note features that allow end-users to annotate their contacts with notes. But creating or accessing notes in a contact usually requires an end-user to navigate to that contact. This may involve navigating to their contact application or, in some cases, navigating directly to a contact via a short cut. In either case, the user experience is focused on the contact and contact application, as opposed to some other more productive activity.

From a more technical perspective, contact-related notes typically reside locally and, to the extent they may be stored in the cloud or distributed across a user's other devices, are relegated to being experienced through the contact application. The multiple steps required of a user to add and edit notes in a contact may consume local resource, such as processing cycles and battery life. The added steps also frustrate users and discourage them from utilizing the note feature in contact application.

OVERVIEW

Mobile application technology is disclosed herein that enhances the ability of end-users to create, edit, and consume notes in association with contacts. In an implementation, a contact-note application is proposed that runs in a computing device. When a phone call event occurs, the contact-note application is notified and responsively surfaces a prompt over a user interface to a phone call application.

When the prompt is selected, the contact-note application surfaces a user interface to the contact-note application. The user interface provides the end-user with a view of a note associated with a contact on the phone call such that they user may create, edit, and consume the note. A technical effect is achieved in that seamless and convenient access is provided to a note associated with a contact, thereby conserving resources and effort.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

For many people, their mobile computing device is their primary (or only) way of keeping track of and in-touch with other people, including their friends, customers, and business associates. The sheer number of people in their contacts can become overwhelming, as can keeping track of all of their various interactions. Technology is disclosed herein for enhancing the contact and note experience on mobile computing devices to allow people to connect with their connections in a more useful, meaningful way.

In an implementation, a contact-note application allows users to quickly create notes and reminders and associate them with their contacts. By bubbling the right note/reminder to the right user at the right time, the application keeps the user up-to date and prepared to take on any new interaction coming their way. A rich notification system provides the ability to surface notes that contain images and reminders as attachments in addition to plain text. This makes the process of providing context much richer than simply surfacing a text notification.

Some of the scenarios supported by the application include create/capture, which allows a user to easily capture context when interacting with a new person/contact. Context helps the user be better prepared for an interaction. Reminders reminder the user of what was discussed previously before having to answer an incoming call. Reminders may also reminder the user to call someone back.

A connection scenario supports team connections so that any member of a team is better prepared for an interaction. For example, a user may be provided with enough information to be prepared for a new interaction. In a simple example, a delivery address may be shared via a note with a delivery person.

Any note taken by a user in the contact-note application that is associated with a particular phonebook contact of the user can be shared with another user that also has the application. This way, the other user, in his or her instance of the application, app will not only have the shared note as a standalone entity, but will have that note along with the associated contact. This is especially valuable in team and group scenarios where not everyone on a team may be aware of what interactions a particular customer may have had with a team member. In the event that one team member receives a call from this contact, the note taken by another team member (which has now been shared with others in the team) will surface to provide context, helping him/her be better prepared to face the conversation.

Figure 1A:
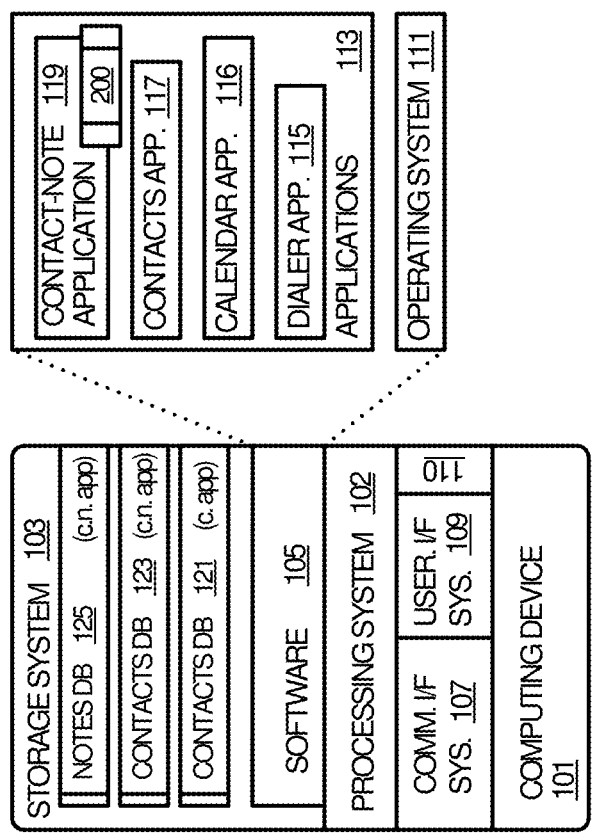
FIG. 1A illustrates a computing device on which a contact-note application may be employed in an implementation.

FIG. 1 illustrates computing device 101 in an implementation of an enhanced contact-note deployment. Computing device 101 includes processing system 102, storage system 103, software 105, communication interface system 107, and user interface system 109. Software 105 includes an operating system 111 and applications 113. Included in applications 113 are dialer application 115, calendar application 116, contacts application 117, and contact-note application 119. One or more of the applications may be omitted in some implementations or, in some cases, included in the context of another application.

Computing device 101 is representative of any personal computing device on which a contact-note application may be employed. Examples include, but are not limited to, mobile phones, tablet computers, wearable devices (such as intelligent watches, eyeglasses, and clothing), laptop computers, hybrid laptop-tablet devices, desktop computers, and any variation or combination thereof.

Contact-note application 119 is representative of any application on computing device 101 capable of performing contact-note process 200. Contact-note application 119 is envisioned as a stand-alone application and in some implementations may be considered a "mobile app." However, contact-note application 119 could be integrated with other applications. In addition, contact-node application 119 could be produced as a web-based application (or web-app), a desktop application, or any other form factor or style.

Contact-note application 119 maintains its data in notes database 125 and contacts database 123. The two databases may be combined in some implementations. Contacts application 117 maintains its own separate contacts database 121.

Figure 1B:
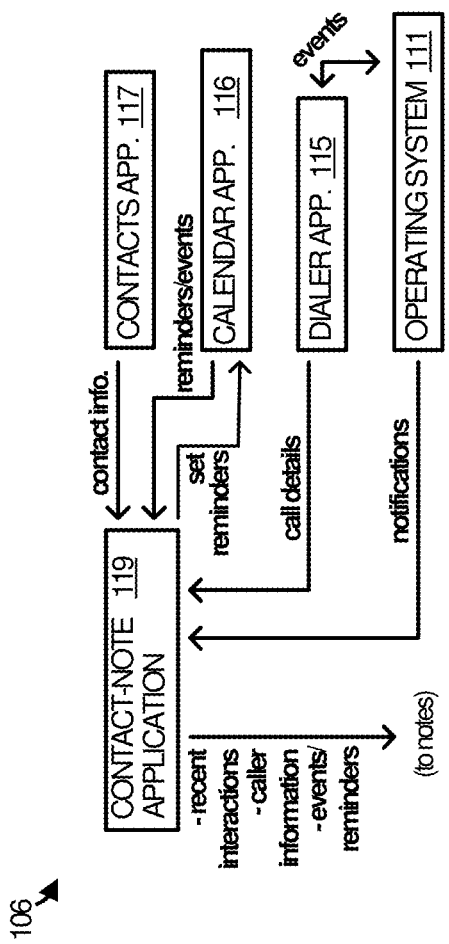
FIG. 1B illustrates an operational arrangement of applications in an implementation of a contact-note application.

FIG. 1B illustrates an operational arrangement 106 with respect to applications 113 and operating system 111. In particular, operational arrangement 106 describes the functional relationships between contact-note application 119, operating system 111, dialer application 115, calendar application 116, and contacts application 117.

In operation, contact-note application 119 interfaces with operating system 111 to receive notifications pertaining to the various call events that may occur with respect to dialer application 115. When the events occur (before, during, or after an event), contact-note application 119 may obtain call details from dialer application 115. The call details may express an incoming or outgoing phone number, the name or alias of a participant on a call, the duration of a call, and any other call detail information that can be retrieved from dialer application 115. In some cases contact-note application 119 calls into dialer application 115 via an API to obtain the information, although contact-note application 119 may be capable of directly accessing call history data. The call detail information can be used by contact-note application 119 to populate the notes stored in notes database 125. In this manner, a given note will reflect the most recent interaction with a contact the next time it is retrieved and surfaced to the user.

Contact-note application 119 also interfaces with calendar application 116 to set and receive reminders and other calendar events. Scheduled events may be retrieved from calendar application 116 (or its associated data store) and information extracted from them with which to populate notes in notes database 125. Contact-note application 119 may also call into calendar application 116 to allow reminders and other events to be set. For example, a control in contact-note application 119 may be capable of invoking calendar application 116 and pre-populating fields in calendar application 116 with information derived from a note in contact-note application 119. The user may then interface with calendar application 116 to persist the reminder to its data store. The note(s) for a given contact in contacts database 123 may then also be populated with the same reminder so that the user is presented with it the next time a note for that contact is surfaced.

Contacts application 117 may also be accessed by contact-note application 119. This may occur when, for example, an incoming call is received in association with a phone number for which no contact is present in contacts database 123. In that case, contact-note application 119 may call into contacts application 117 (or directly into its associated data store) to check whether or not a contact exists in contacts database 121 for that phone number. If a contact exists, the contact-note application 119 can read information from the contact and integrate that information into a note to be surfaced on the call. The contact information retrieved from contacts database 121 can be persisted to contacts database 123 and/or merged into a note stored in notes database.

Figure 2:
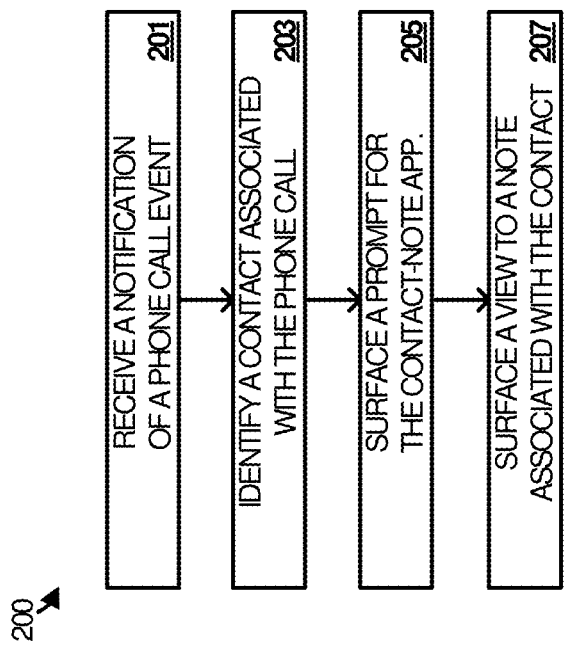
FIG. 2 illustrates a contact-note process in an implementation.

Referring parenthetically to the steps illustrated in FIG. 2, the following describes at least some of the operations involved in contact-note process 200. In operation, a contact-note application (e.g. contact-note application 119) receives a notification of a phone call event occurring on a device in association with a phone call (step 201). The notification may be provided by an operating system, an application, or some other software element running on the device. For example, the contact-note application may be hooked into one or more event reporting services provided by an operating system.

The contact-note application responsively identifies a contact associated with the phone call (step 203). This may involve, for example, searching its own database of contacts, querying a contact application with respect to the contact application's contact database, or identifying a contact in some other manner Information from the phone call may be used to identify the contact, such as the phone number or service handle for the call.

At or around the same time, the contact-note application surfaces a prompt for a user to enter a user interface to the contact-note application (step 205). The prompt may be surfaced in an overlaid manner with respect to a user interface to a phone calling application that hosts the phone call. If so desired, the end-user may select the prompt by way of a touch, gesture, spoken command, mouse click, or any other suitable user input.

When the prompt is selected, the contact-note application responsively surfaces a view to a note associated with the contact for the call (step 207). The view may provide the user with a mechanism for creating a new note to commemorate details and context about the phone call. In other situations, the view may illustrate a previous note that describes details, context, and other information about a previous phone call (or other interaction) associated with the contact. A variety of other types of notes are possible in addition to those disclosed herein and may be considered within the scope of the present disclosure.

Figure 3:
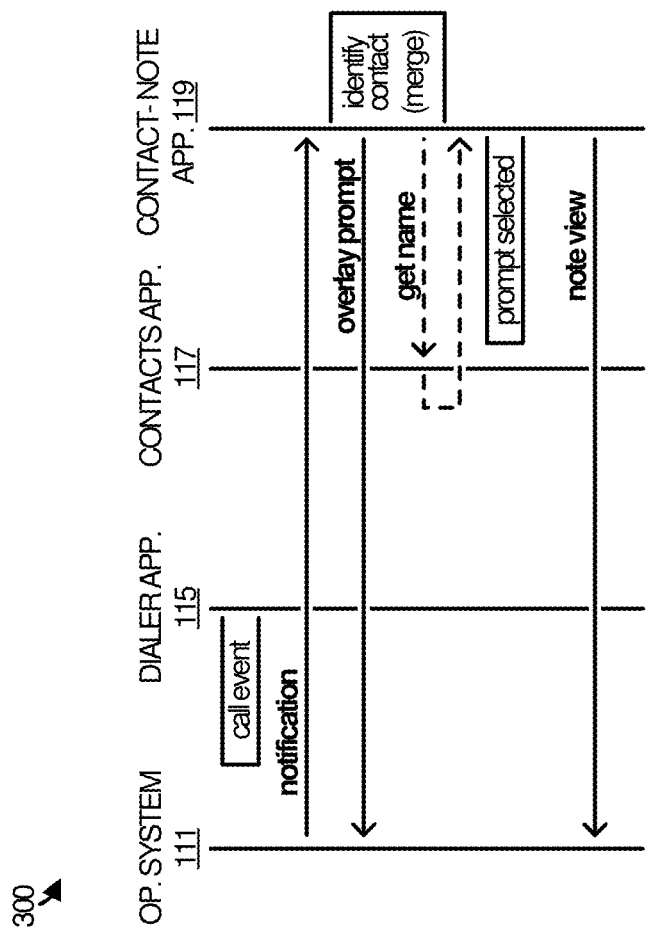
FIG. 3 illustrates an operational sequence in an implementation.

FIG. 3 briefly illustrates an operational scenario in an implementation of enhanced contact notes. In operation, a call event occurs with respect to a phone call hosted by dialer application 115. The call event may be, for example, the end of a call, the arrival of an incoming phone call, or the initiation of an outgoing phone call, as well as any other phone call event.

Contact-note application 119 receives a notification of the call event and responsively proceeds to identify a contact associated with the call. At or around the same time, contact-note application 119 surfaces an overlay prompt for a user to enter its user interface. This may involve communicating directly or indirectly with operating system 111, or possibly with some other elements responsible for handling user interface operations.

Contact-note application 119 may optionally communicate with contacts application 117 to obtain information associated with the contact, such as a name when the name of the contact is missing from contacts database 123 but present in contacts database 121. When this happens, contact-note application 119 may merge the information together for presentation in a note view.

The note view is presented if the end-user selects the prompt that is surfaced over the user interface to dialer application 115. The note view may include a new note descriptive of the phone call, a previous note descriptive of a previous interaction(s), or any other information that may be or have been captured in the note.

It may be appreciated that, while the scenario illustrated in FIG. 3 involves surfacing a note in response to a user selecting a prompt, such a step is optional. That is, a note may be surfaced automatically in response to the occurrence of an incoming or outgoing call, without the need for user input to trigger the process. In the case of an incoming call, automatically surfacing a note provides an enhanced caller ID functionality. Such functionality may be provided by a stand-alone application, such as contact-note application 119, but could also be integrated into an existing application, such as dialer application 115. Indeed, it may be appreciated that any or all of the functionality provided by contact-note application 119 could be integrated into dialer application 115.

Figure 4:
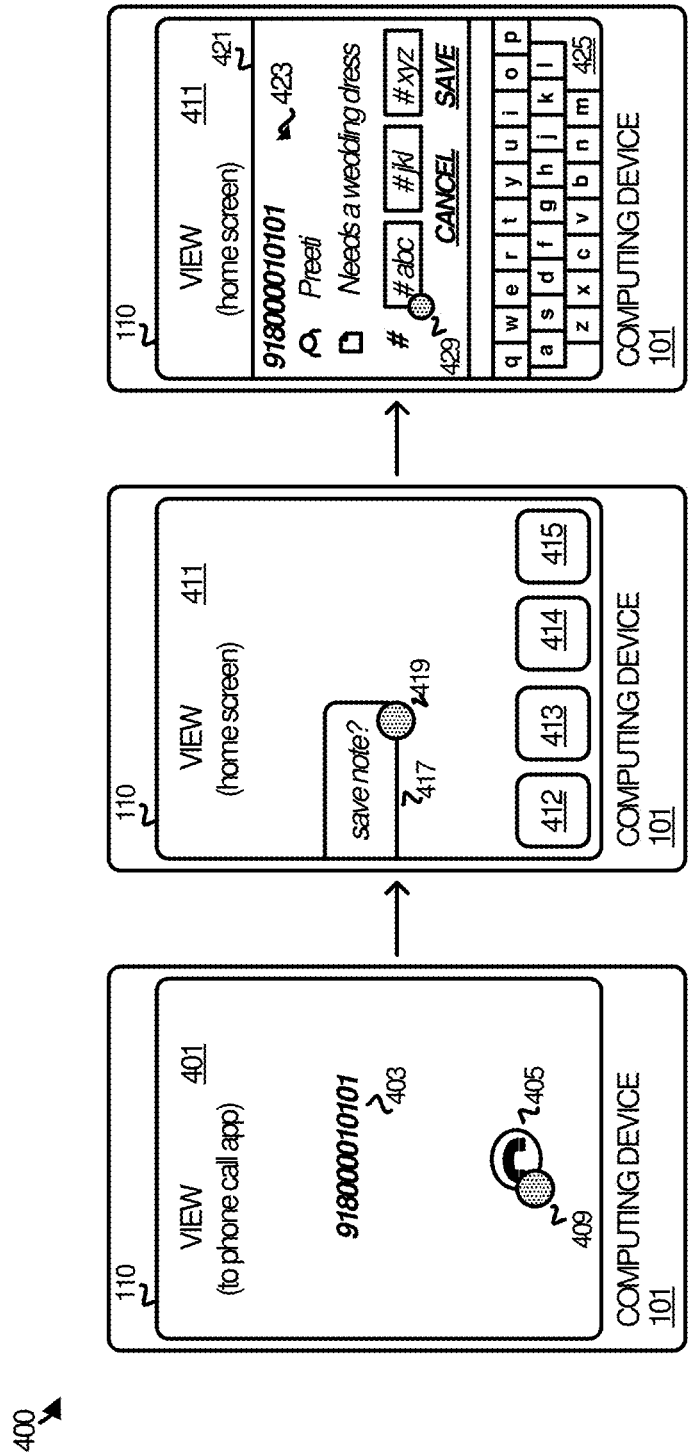
FIG. 4 illustrates an operational scenario in an implementation.

FIG. 4 illustrates an operational scenario 400 to better illustrate various aspects of contact-note applications. In operational scenario 400, various views are illustrated that may be rendered on display 110, beginning with view 401.

View 401 is representative of a view that may be presented by dialer application 115 during the course of an ongoing phone call. View 401 includes at least phone call information 403, such as the phone number, name, duration, or other similar information. View 401 also includes a control 405 for ending the phone call.

In this scenario, the end-user provides user input 409 to end the call, such as by touching, gesturing, speaking a voice command, or clicking a mouse. The end-of-call event results in the transition of view 401 to view 411 as the dialer application 115 is closed and the home screen to the device is surface. View 401 includes various icons 412, 413, 414, and 415 which are representative of the icons that may be found on a home screen.

View 401 also includes a graphical prompt 417 surfaced by contact-note application 119 in response to being notified about the end of the call. The graphical prompt alerts or reminds the end-user that it is possible to save a note about the phone call. The end-user provides user input 419 to select the prompt, which results in a transition to view 421.

View 421 is representative of a view of a note that may be provided by contact-note application 119 at the end of a call. View 421 is a partial overlay with respect to view 411 and includes various view elements 423 that aid the user in creating a note for the call. The view elements 423 include, for example, a phone number for the call, the name of a participant on the call, some text descriptive of the content of the phone call, and various contextual suggestions (# abc, # jkl, # xyz). Controls are also available to cancel out of the view or to save the note, as well as a keyboard 425 for text input.

In this example, the end-user makes a selection 429 of one contextual suggestion (# abc). The contextual suggestion is thus persisted to a note for the call, which is stored in association with a contact for the call participant. The same note may be retrieved at a later time for a subsequent call, to provide the user with context about the call participant and their last call.

Figure 5:
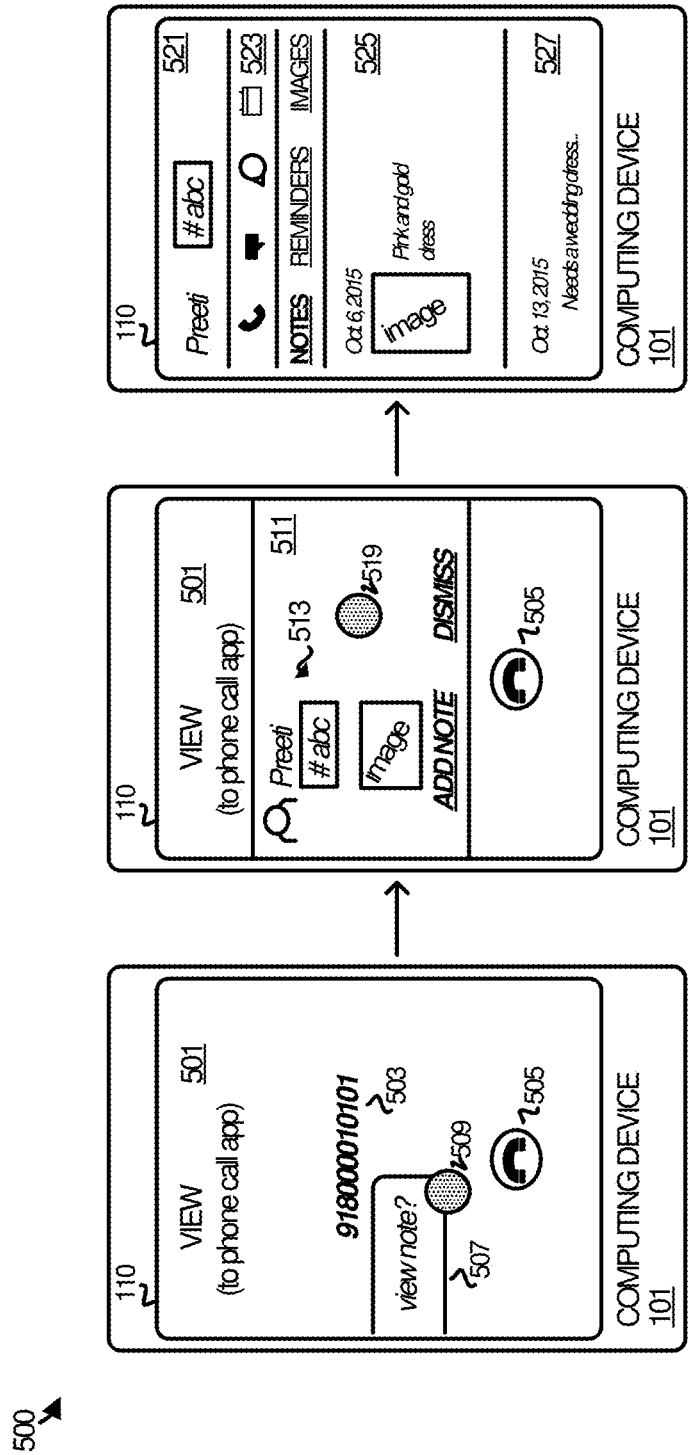
FIG. 5 illustrates an operational scenario in an implementation.

FIG. 5 illustrates one such scenario in operational scenario 500. In operational scenario 500, an end-user is presented with a view 501 to dialer application 115. View 501 is representative of a view that may be presented when an incoming or outgoing call is being conducted. View 501 includes various details 503 about the call, as well as a control 505 for ending the call.

A prompt 507 is surfaced over view 501 to prompt the user to enter a user interface to contact-note application 119 during the call. A selection 509 is made by the user by way of any suitable user input (touch, gesture, spoken command, mouse click, etc.) to transition to a view of a note for the call.

View 511 of a note is surfaced by contact-note application 119 that is descriptive of at least some past interaction with a participant on the call. View 511 includes various view elements 513, such as the context suggestion that was selected in operational scenario 400. Other content from other notes may also be included in view 511, such as an image that may have been stored in association with the contact, the name of the contact, and so on. Another user input 519 is received that triggers contact-note application 119 to transition from view 511 to view 521.

View 521 is representative of a full view of the contact that may be presented by contact-note application 119, in contrast to the partial overlay views. View 521 again includes various view elements 523 with which the user can interact to create, edit, or consume note content. Examples include, but are not limited to, various controls for launching phone calls, instant message, or reminders. The view elements 523 also include identifying information for the contact, such as her name, as well as a context descriptor that describes how the end-user knows or is related to the contact.

Individual notes are included in the view elements, of which note 525 and note 527 are representative. For instance, note 525 includes an image and text to go along with the image. Note 527 is additional text that may be consumed by the end-user.

Figure 6:
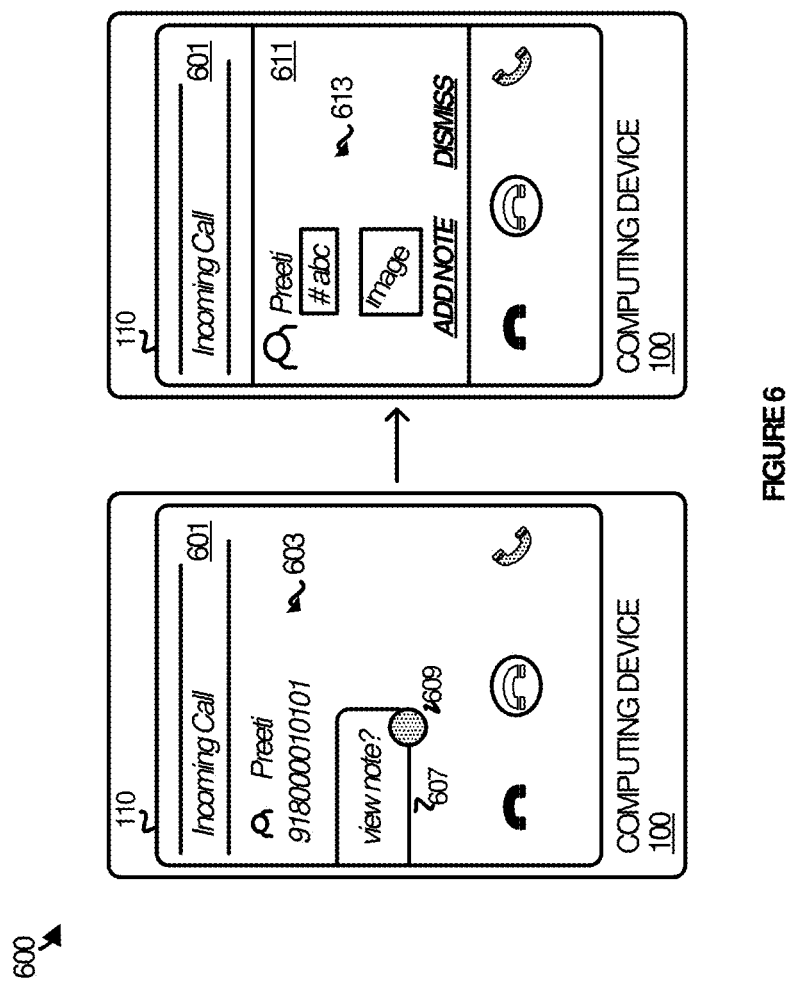
FIG. 6 illustrates an operational scenario in an implementation.

FIG. 6 illustrates operational scenario 600 in another implementation. Operational scenario 600 is representative of an incoming-call scenario.

In operation, dialer application 115 surfaces view 601, which is a view that may be presented when a call is incoming, before the user has answered it. View 601 includes various view elements 603, such as information about the call (phone number, caller ID), as well as controls for either answering the call or ignoring the call.

Contact-note application 119 surfaces prompt 607 in an overlaid manner with respect to view 601. The prompt alerts the user that a note is available for the call, which may be viewed if the prompt is select. The user provides user input 609 to select prompt 607, which triggers contact-note application 119 to surface view 611.

View 611 is representative of a view of a previous note that may be presented by contact-note application 119 for an incoming call that is associated with a note in notes database 125. View 611 include various elements 613, such as information about the contact (name, context), a past image or images, or possibly other information. The view 611 also includes various controls for interacting with contact-note application 119, such as the option to add a note or to dismiss view 611. View 611 provides the user with quick access to notes about a participant on the incoming call, without having to navigate to notes in a contact.

In some implementations, a note may be implemented in accordance with a card model. Each card may be an independent entity which contains both contextual and the visual information. Cards are persistent and can be shared. Each card is uniquely identified and represents one entity only. Multiple cards can be related and relationship chain can be created. The prominent cards used in the contact-note application are Notes and Contacts with each note being associated with a contact. A specific storage model may be used in some application in which the contact-note application uses a schemaless noSQL database at the client side to store data.

The data structure supporting a note may be accomplished in a variety of ways. In some implementations, the data structure may include a receiver identifier that indicates one or more people to send a note to. A sender identifier may then also be included to identify the person sending a note. The content of the note may be represented in text in the data structure and image URIs (uniform resource identifiers) for any images in the note. Image data may or may not be directly part of the note. When not a direct part of the note, images may be uploaded to blob storage (e.g. Azure) and their links maintained in the data structure. Lastly, the data structure may also include a contact identifier, as notes are created in the context of a particular contact/customer. The contact ID is the identity of the contact with whom a note is associated.

Such data structures may be made extensible and may allow for augmentation either via machine learning or explicitly by a third-party. In some implementations, intelligent processing may be performed on the content of the note to identify terms or keywords in the note which allow the contact-note application to surface contextual actions on the note. As an example, if a note's text has a date and time mentioned somewhere, then the application can surface an action which allows the user to add a reminder to the calendar for that date time.

Note sharing may also be augmented by the different types of data that can be represented in the note. A note could be utilized as an intelligent control message—not just for sharing textual content. For example, three different data types may be supported in a note: Textual content, Images and Contact data. When a note contains a reference to a Contact with which the note is associated, the contact-note application on the receiver-side of a shared note may automatically create the Contact on the receiver side if it doesn't already doesn't exist. A similar function could be accomplished with other supported data types (e.g. data and time, location information). For example, a note could be used to create a reminder in the calendar of the receiver by putting in a date time in the note data structure. Location information in the note data structure could be used by the receiver to launch an intelligent visualization (map view of the location) for the note data.

A prompt may be implemented as a floatie, which is an Android® activity that is linked to broadcast receivers. Once the contact-note application receives an event like an incoming or outgoing call, the application's code is activated to read the phone number and perform checks in the application. The application logic then decides the right action to be displayed to the user. The floatie provides a quick contextual info and has actions that allow to do more detailed tasks. Based on the context, the application can directly: a) read previous note cards for the associated contact; b) create new note cards; c) create a reminder card to be reminded in the future; and d) add a new contact card and assign a category to the same for future reference. The schema-less database is updated with the latest information Note sharing may be accomplished in a variety of ways. Each user of the application has a unique ID and is authenticated as per their phone number. One can share a note card which has the context of the contact and the details of the context with any other user in the ecosystem. The sharing is implemented using Azure® Push Notification and transmitted over an https channel from one device to another. The sharing of images on a note card is done using a Push to Pull mechanism using Azure® storage blob with the lifetime on the cloud storage of 30 days. This way one cannot just send the contact details but also the context of the contact and the actions associated with it.

In some implementations, note sharing may be executed in a dynamic manner whereby notes are shared with other contact-note application users in the note data structure formatted for the application. However, many end-users may have yet to obtain the app. A contact-note service running in the cloud can accommodate both types of users.

When a user installs the contact-note application, the application will upload contacts from the user's phonebook to the service. The service creates a user entry in its cloud service database for the user who installs the app. The entry contains information, such as the user's phone number, the user's name, and so on. The service also creates similar entries for all users or the contacts which get uploaded from the phonebook even though the contacts in the phonebook may never have installed the contact-note application.

When a user installs (and signs-in) the application, the service checks in the service database whether or not an entry has already been created for the user. An entry may already exist for a user if, for example, the user was present in the phonebook of someone else who has already installed the application. If the user entry is already present, the service updates it to indicate that this user has now installed the app. Otherwise the service creates a new entry. The service uses the user's phone number to identify a particular user, using the phone number as identity during a sign-in process. In other word, the service maintains a contact directory and knows which users have the app installed and which users don't have the app (and were simply uploaded from the phonebook of some user who installed the app).

This information is also replicated locally on the device from the service database. In other words a local instance of the contact-note application knows that which contacts in the user's phonebook have the app installed and which don't. This allows the service to provide differentiated behavior when a user forwards a note to a contact. If the receiver has the app installed, then the sending app pushes the standard note data structure to the service which then pushes the note to the receiver where the app receives the forwarded note and does the necessary processing. However if the contact to whom the note is being forwarded doesn't have the contact-note app installed, then the sending app forwards the note using an existing communication channel (e.g. WhatsApp, other messaging platforms), but the note data structure forwarded in this case is different since the receiving end doesn't have app to process the forwarded note. In this case, the content of the note is shared on WhatsApp (or some other communication app which the user chooses). The forwarded note content may also contain a link to the contact-note app/service inviting the receiving user to install the app.

Rich notifications may also be accomplished in a variety of ways. Android® provides a notification mechanism which can consist of images and text. The contact-note application uses the same mechanism and enhances the same to provide far richer notifications which consist of not just text and images but also allows actions on the same from the notification area itself. This may be combined with natural language process in the application to make notifications even richer, to allow for interacting the system to set auto reminders, create meetings, and update schedules, for example.

Figure 7:
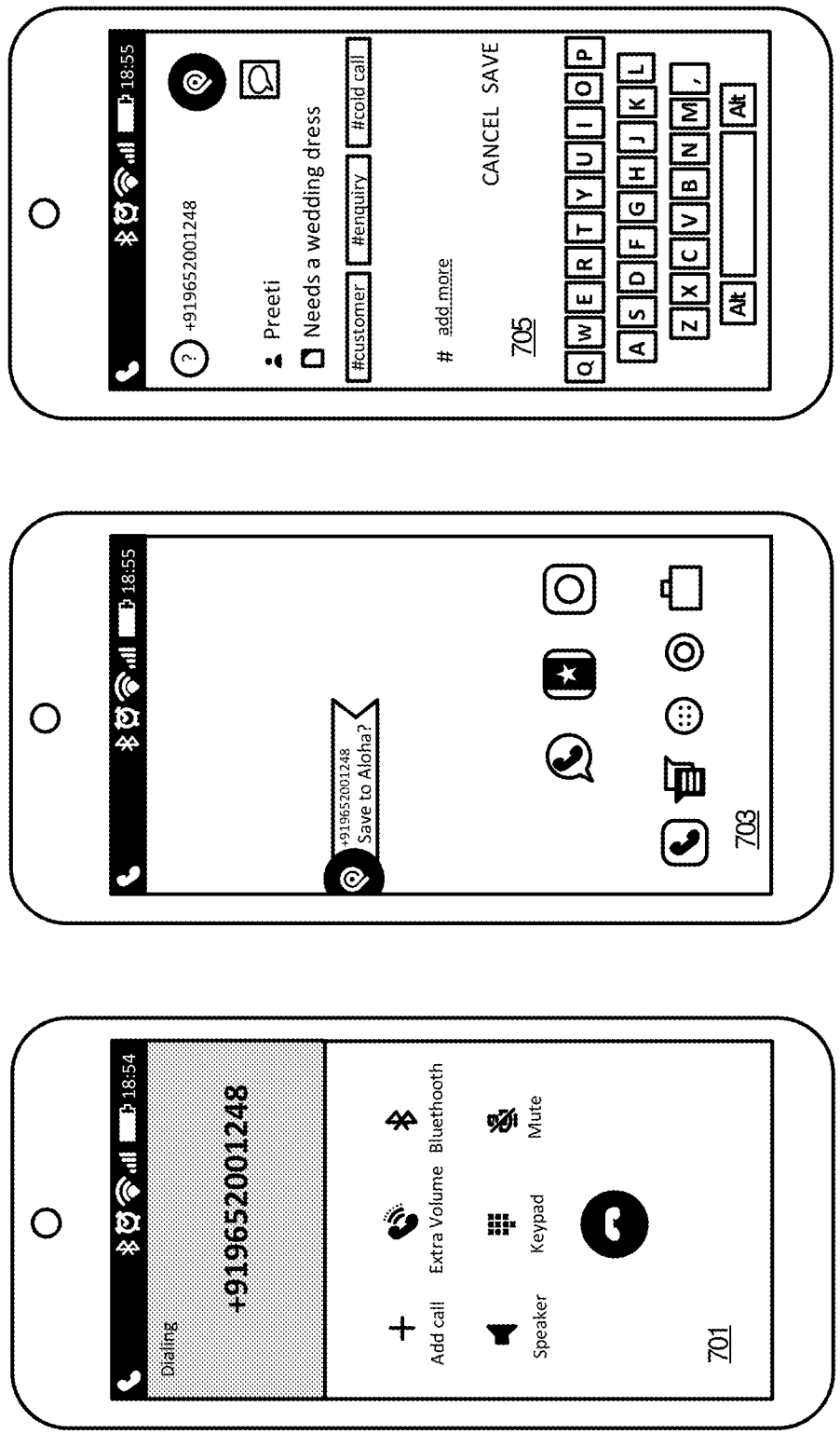
FIGS. 7-12 illustrate various screen shots of views produced by a contact-note application in an implementation.

FIGS. 7-12 illustrate various screen shots or views that may be produced in an implementation of a contact-note application. In FIG. 7, view 701 shows a dialing screen that a dialer application might produce. View 703 is representative of home screen with a floatie that surfaces after a call. View 705 represents a screen that a contact-note application produces to view and interact with a note.

Figure 8:
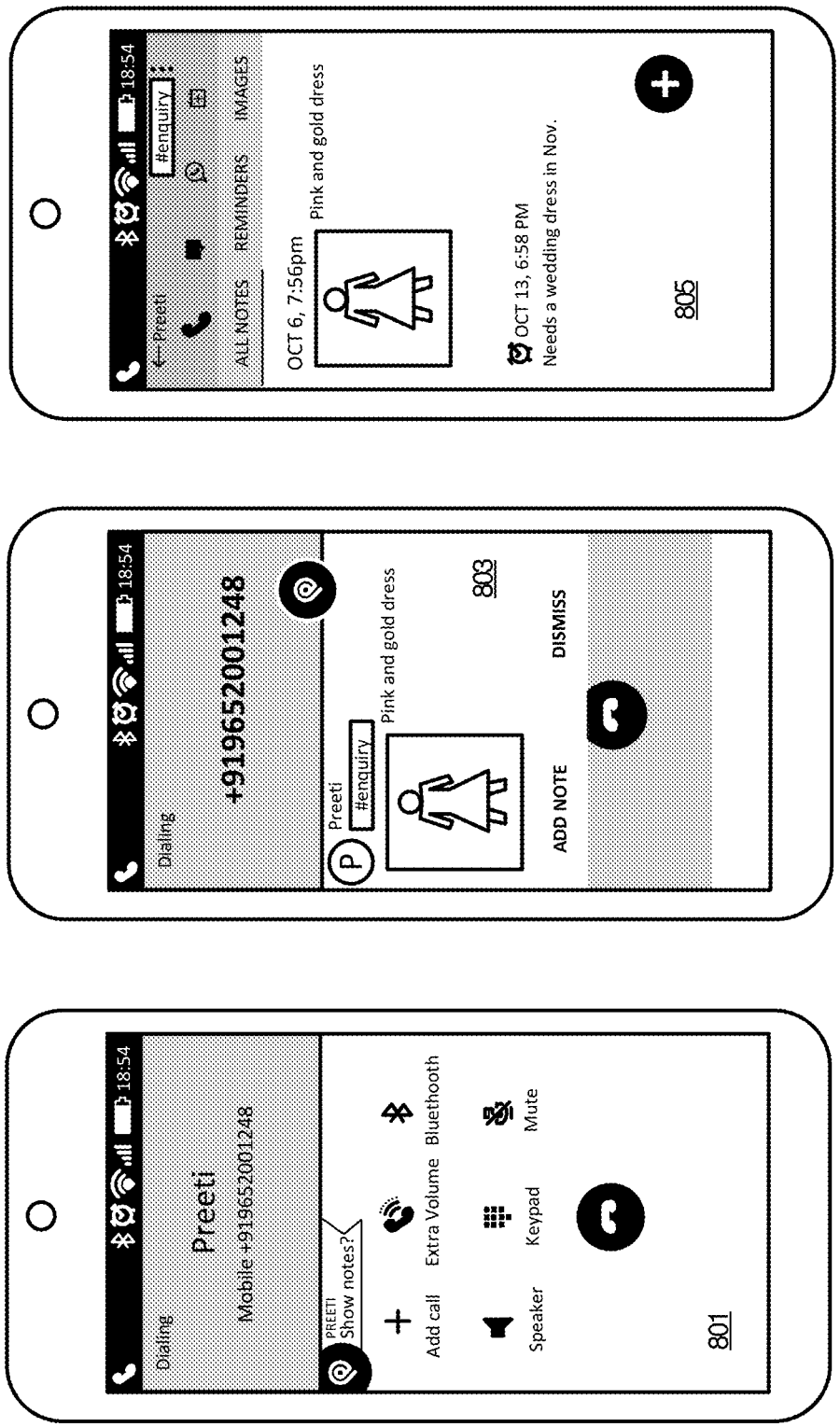

In FIG. 8, view 801 is illustrate, which represents a dialer screen with an overlaid floatie. Note 803 is surfaced over the dialer screen when a user selects the floatie. View 805 is produced when the user fully enters the contact-note application.

Figure 9:
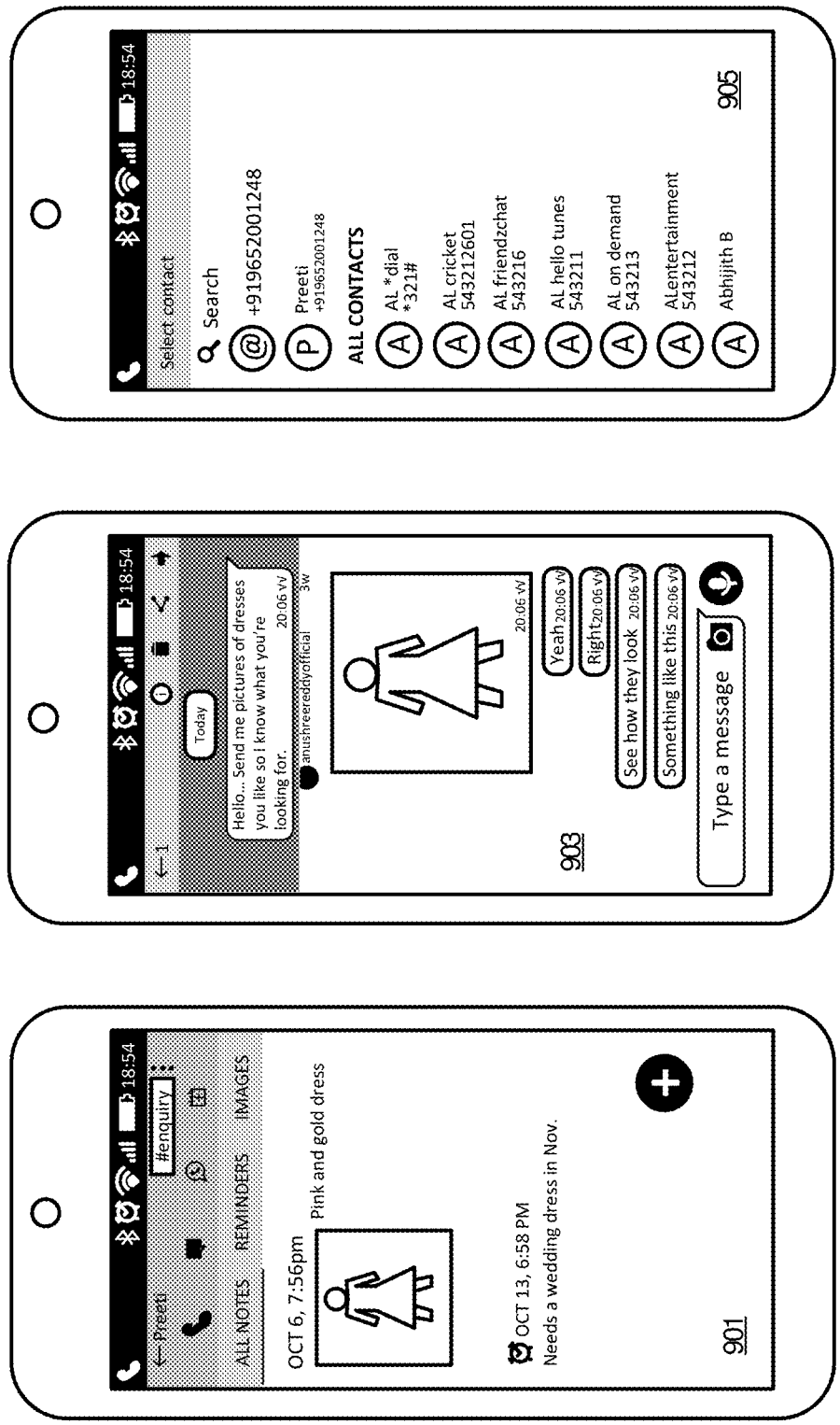

FIG. 9 illustrates another view 901 produced by a contact-note application. The end user can select a particular note in view 901 to transition to view 903, which provides a more detailed view of a related conversation. View 905 shows a list of contacts associated with notes in the contact-note application.

Figure 10:
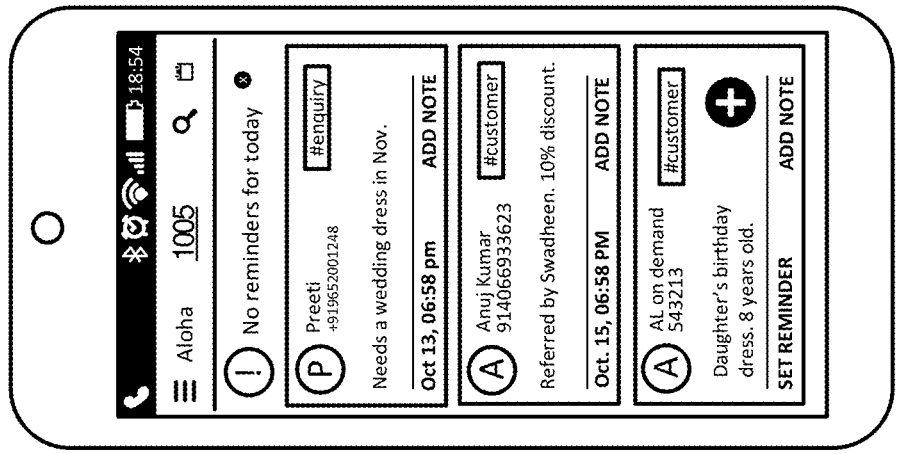
Figure 10:
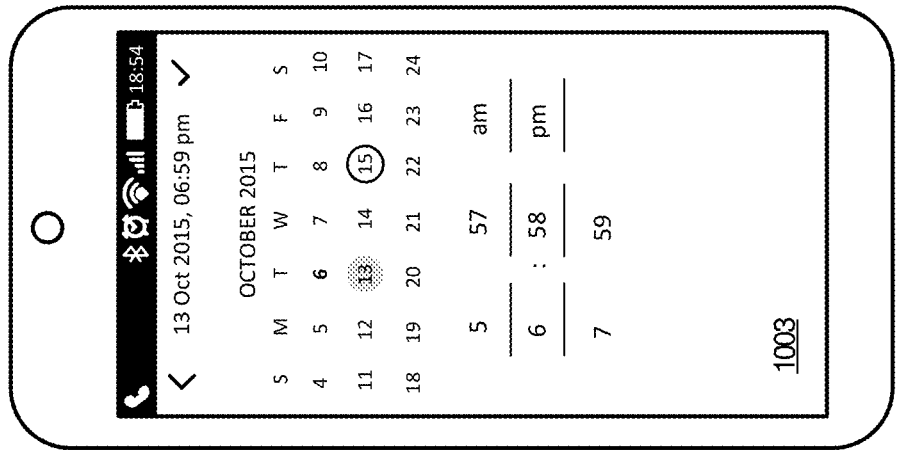
Figure 10:
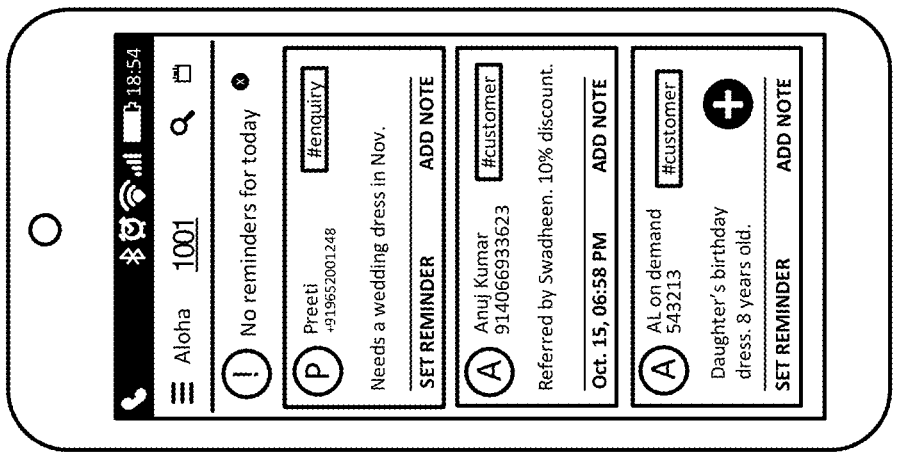

FIG. 10 illustrates another view 1001 produced by a contact-note application. View 1001 shows several note cards for contacts in the application. View 1001 may transition to view 1003 if a user wants to set a reminder or otherwise interact with calendar functions. View 1005 shows that the user set a reminder date for Preeti.

Figure 11:
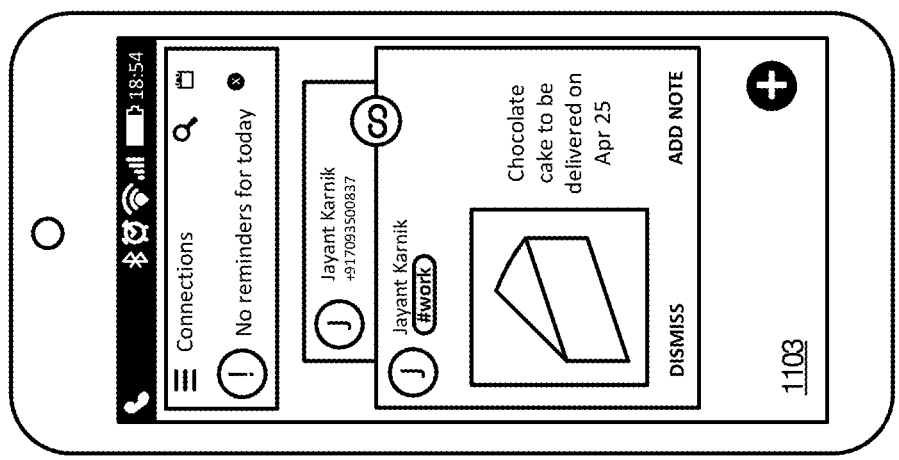
Figure 11:
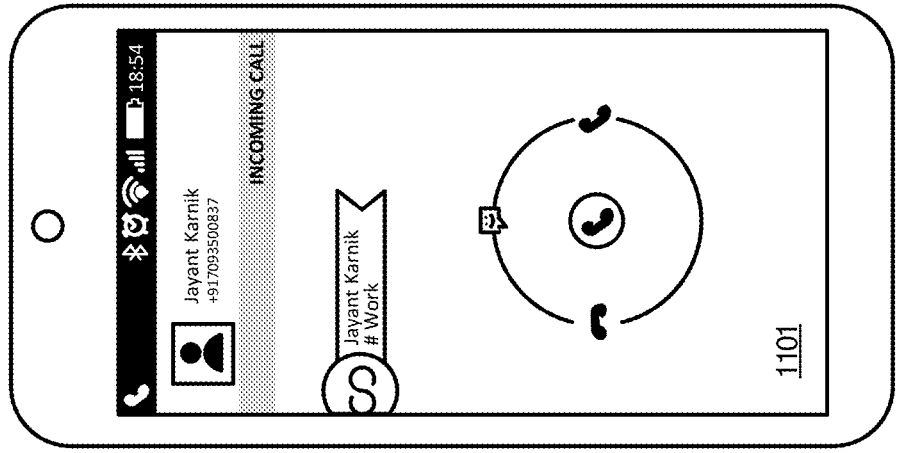

FIG. 11 illustrates a view 1101 that is produced when an incoming call arrives. A floatie is surfaced over the screen, allowing the user to view a note on the incoming caller before deciding whether or not to answer the call. Selecting the floatie transitions the screen to view 1103.

Figure 12:
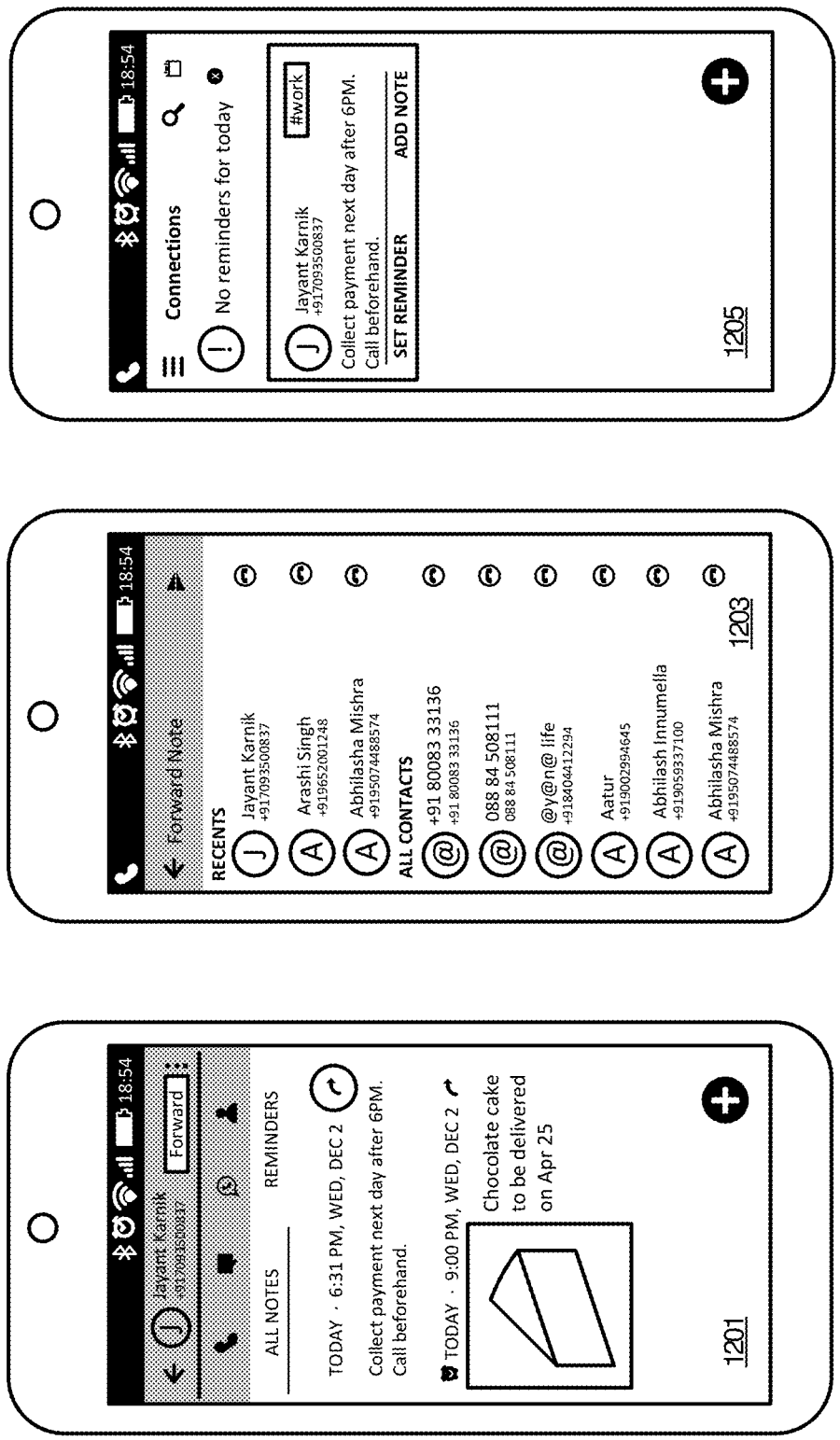

FIG. 12 illustrates a view 1201 with options for forwarding a note to another user. View 1203 provides a list of contacts. View 1205 shows the note on another user's phone who has the same app.

In an alternative, FIGS. 13-18 illustrative various views that may be produced by a contact-note application or any other application having document editing capabilities. The application may provide for the aggregation of content (primarily created on a mobile device), such as images, voice, video, location, and text to build these documents. Documents may be "template-ized" to enable people to quickly create reports, brochures or other assets relevant to these users and to export/share them on relevant platforms.

Such an application may allow images to be enhanced by adding text, such as captions, copyright, watermarks, location data, date, and time. Furthermore, inking may be supported with different colors. The ability to add an audio overlay to augment the visual content on the image may also be supported.

Images can be enhanced with adding text which include captions, copyright, watermarks, location data, date time. Furthermore, inking is supported with different colors. Most unique is the ability to add an audio overlay to augment the visual content on the image The application may allow for sharing across formats and allows for similar views across the same. For example, the application may allow a user to build a beautiful brochure with images and text to share with customers by exporting to PDF. The user may be able to create a presence on Facebook®, to reach more consumers with their portfolio created just a mobile device. In another example, a user may use images, voice, and text to build an insurance claim report that can be shared with management using email channels.

A specific format may be utilized for a presentation to allow for sharing across formats and to allow for similar views across the same. Users may be provided with template types and associated typography to select how each page/card is rendered. A tap to preview allows for a preview but the construction and output are largely WYSWYG.

Each presentation can be viewed with details of the presentation where the user can add new images, using intents or add text using keyboard/stylus. Once an image is added to the activity, the application allows actions on the image using different activities.

An ink activity allows inking on an image canvas and stores that as part of the image. Undo functionality is provided by maintaining the state of the canvas.

An image filters/effects activity, based on openGL, supports image transformations with the actual image. The user can select the desired effect on a new activity. The change is stored in the cache and original image is not touched.

With templates, a pre-configured template view shows each screen with the application of those templates and allows the user to quickly select the best that fits the need. Each selected view can be further modified as per the need.

An audio record/play feature uses microphone APIs to record on each screen. When done, the audio clip is compressed and stored along with the data and referenced in the presentation file. A user can replay the audio and delete/record the clip.

Each presentation may have metadata properties that can be enabled. These include date/time, location and creator. Date/time is picked from either the image properties (if clicked externally) r by the present details (if clicked from the presentation). Location is also derived either from the image metadata or is actually calculated as per the present location using a GPS API. This metadata is stored in the presentation format and may be displayed on each page.

A preview mode is available that is a swipe controlled view where one can see each page with all the elements and autoplay of the audio if there is any on that screen A film strip mode is a quick way for a user to view the different pages of a presentation on mobile. It also allows reordering/deleting of pages. Created from the original presentation, but with a scaled down version of the images, this is useful for navigation and quick access.

Sharing can be accomplished in a variety of way and in multiple formats. Design conversions happen at the client side and not on the service. The application still uploads the complete presentation data to a cloud storage blob (Azure® cloud storage), so that the receiver can get the same fidelity. HTML5 conversion on the client allows a rich view on any device and even allows audio playback. Sharing to social media sites like Facebook® is done through intents on Android®.

A home screen may also be provided with a layout that consists of presentations as well as card elements. Each card represents a presentation as an entity. A user can take actions on the complete document presentation, like share/delete. The home layout is a recycler view activity sorted in the time of presentation access order.

Figure 13:
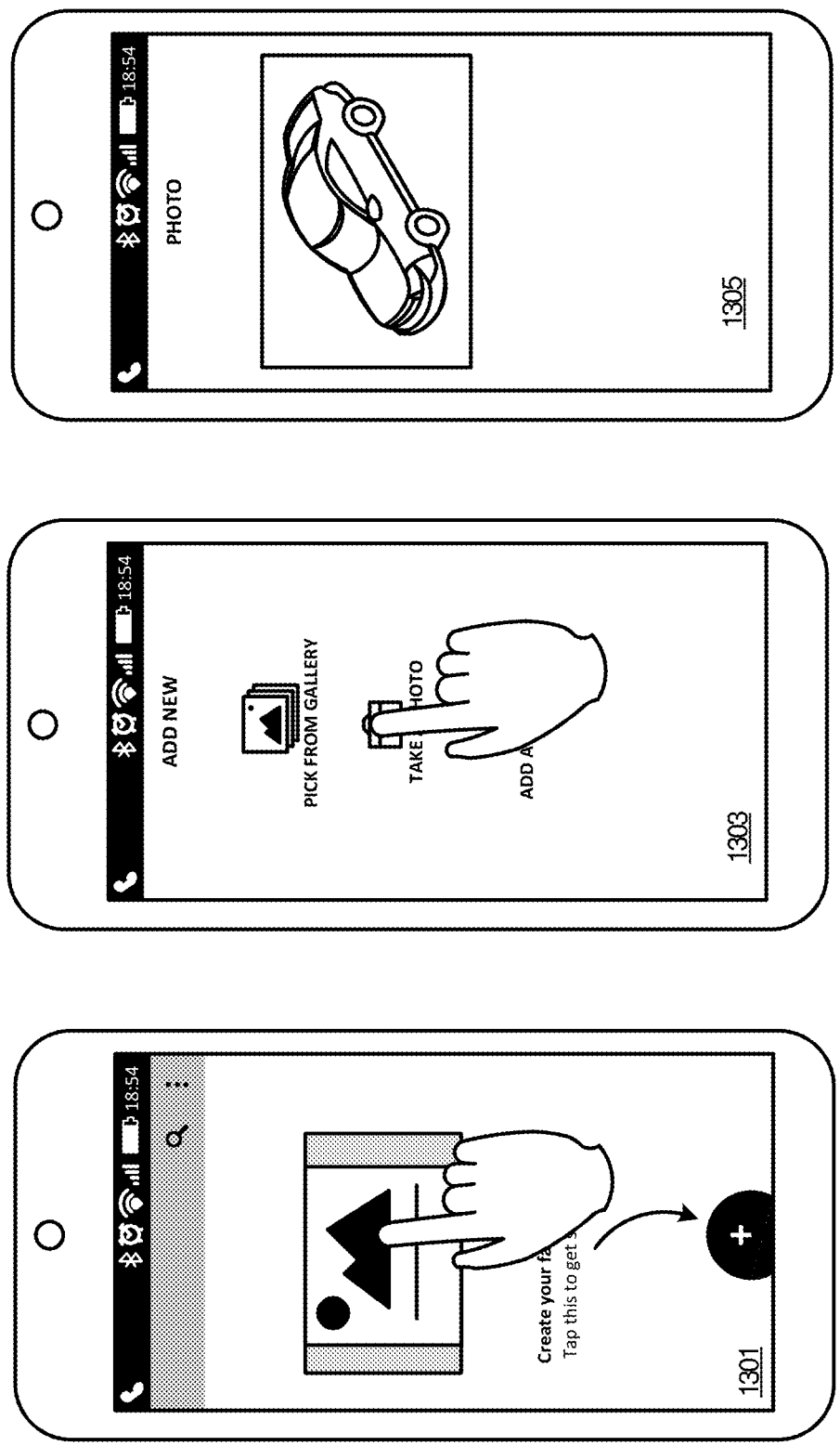
FIGS. 13-18 illustrate various screen shots of views produced by a presentation editor application in an implementation.

FIG. 13 illustrates how content can be easily captured. View 1301 allows a user to create a presentation. In view 1303, a source is selected (take a photo). View 1305 represents the photo taken by the user.

Figure 14:
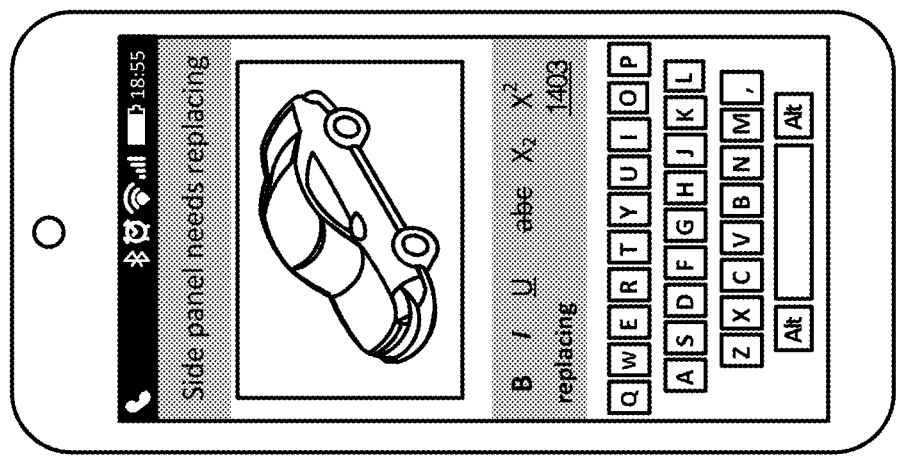
Figure 14:
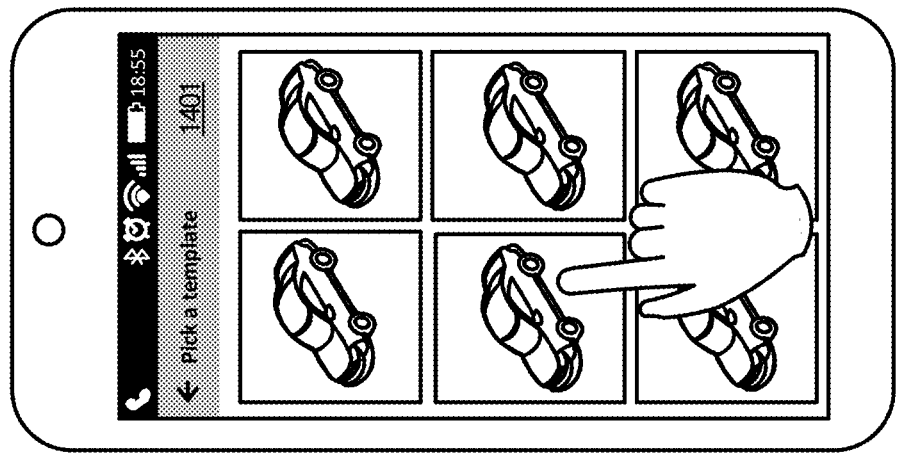

FIG. 14 illustrates the ease with which a user may augment a presentation. In view 1401 an image is selected. In view 1403, the user may change aspects of the photo.

Figure 15:
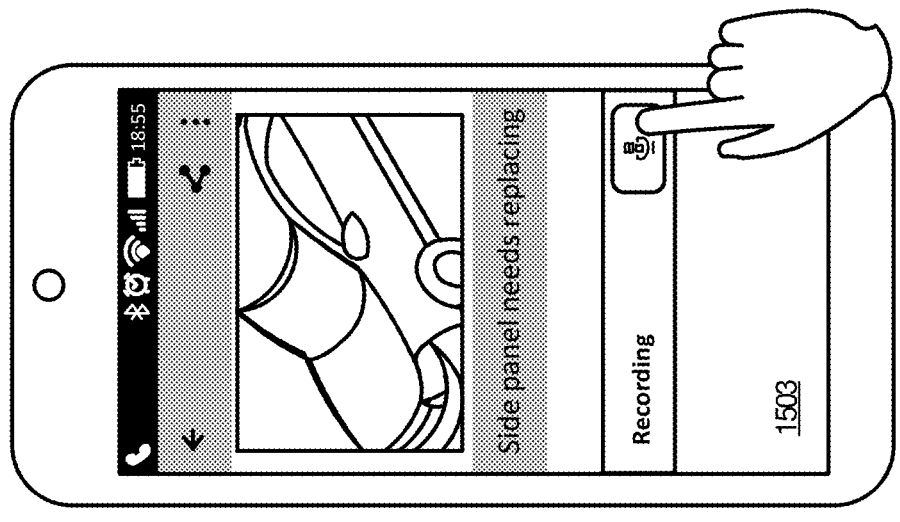
Figure 15:
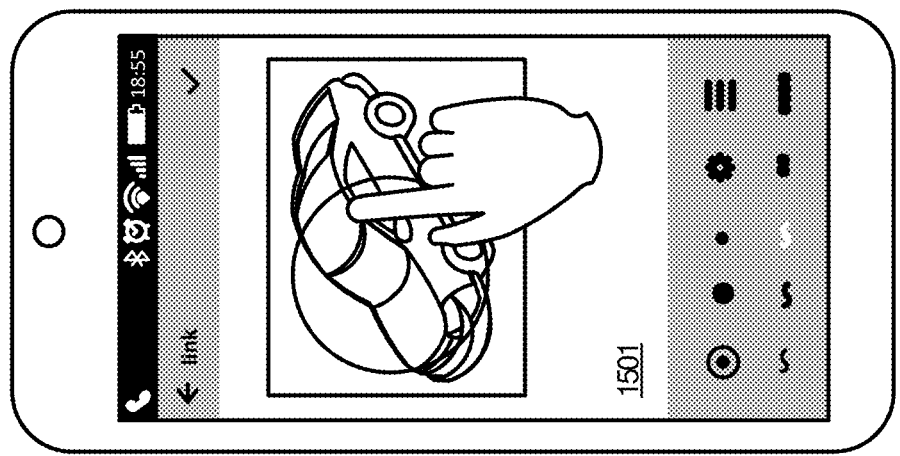
Figure 16:
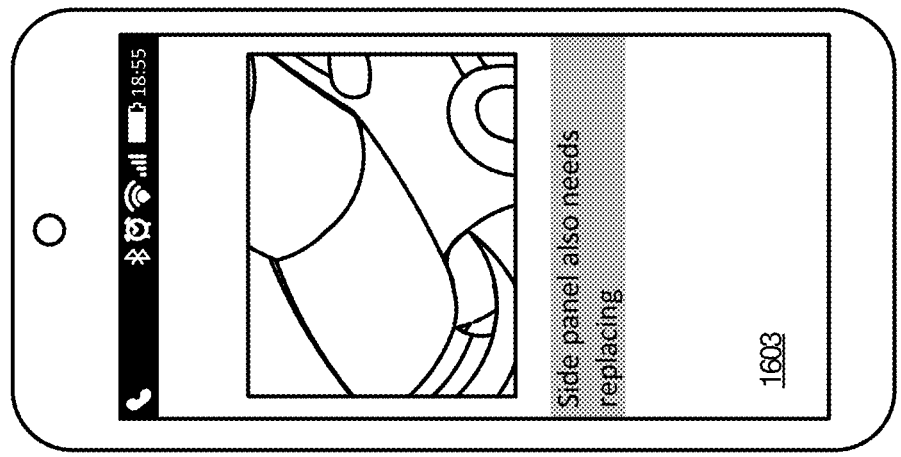
Figure 16:
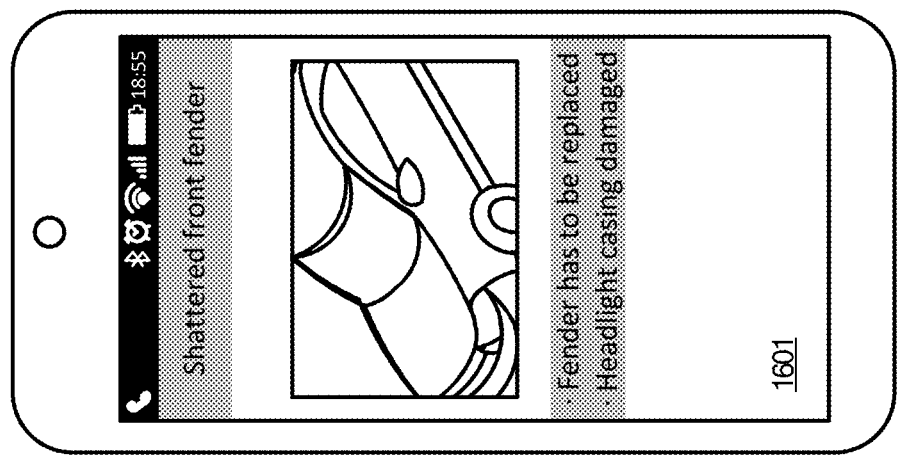
Figure 17:
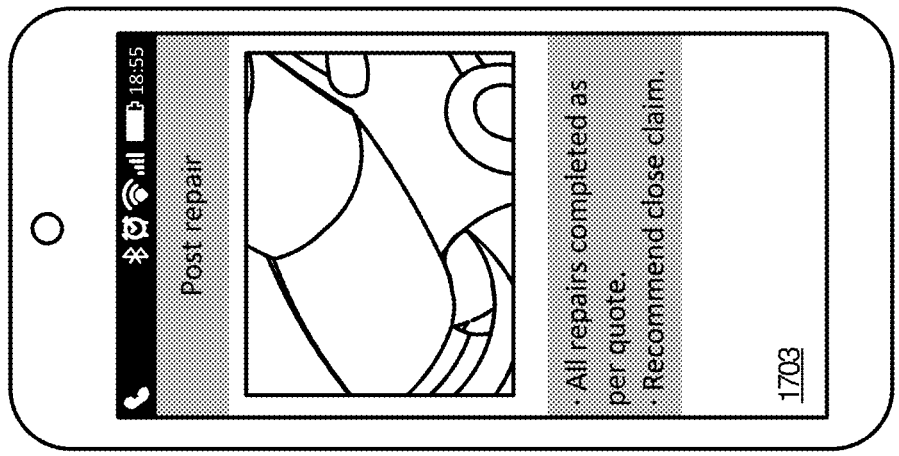
Figure 17:
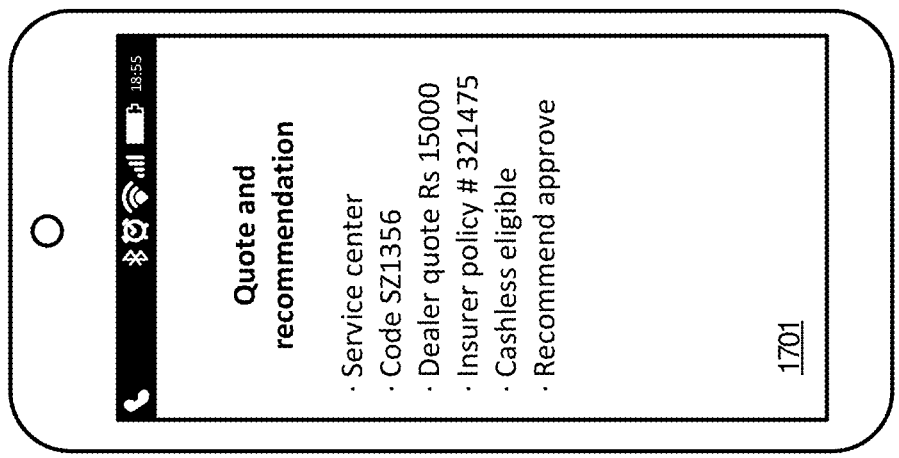

In FIG. 15, the user zooms-in on a portion of the photo in view 1501. Then the user may augment the photo with a recording, made available in view 1503. In FIG. 16, a visual report is produced in view 1601 and view 1603. FIG. 17 also illustrates various aspects of a report that may be produced in view 1701 and view 1703.

Figure 18:
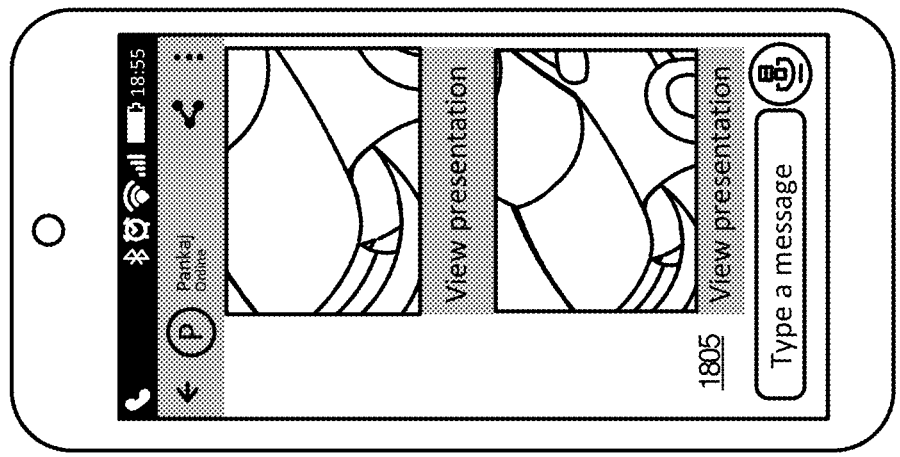
Figure 18:
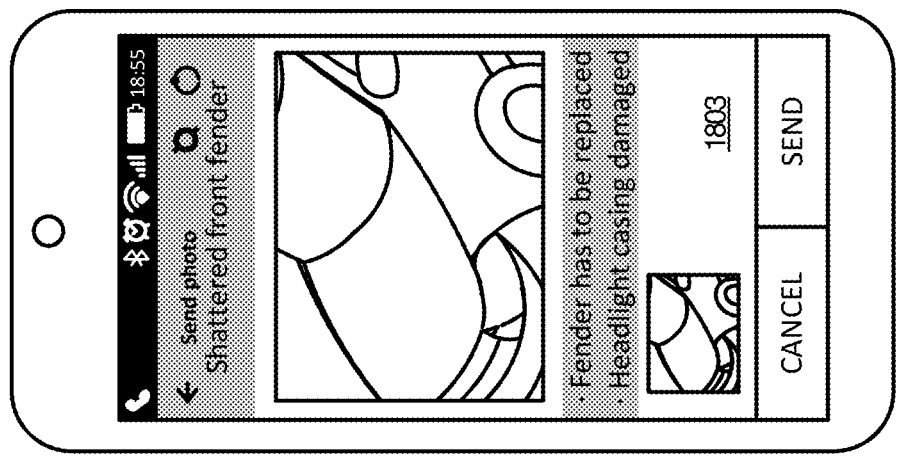
Figure 18:
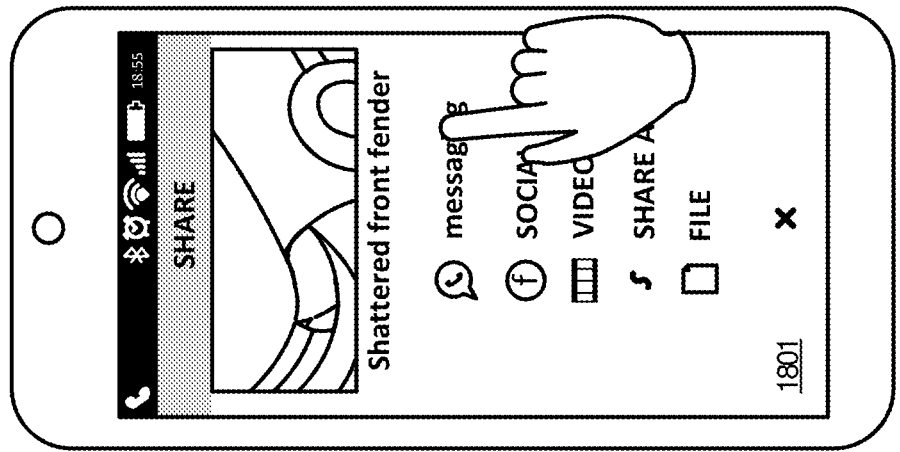

Lastly, FIG. 18 illustrates ways in which a user can share the report. In View 1801, the user selects a sharing mode (messaging, social media, etc.). In view 1803, the content may be previewed before sending. View 1805 represents what the user on the receiving side of the sharing would see.

Referring back to FIG. 1, computing device 101 is representative of any system or collection of systems in which the various operational architectures, scenarios, and processes disclosed herein may be implemented. Examples of computing device 101 include, but are not limited to, smart phones, laptop computers, tablet computers, desktop computers, hybrid computers, gaming machines, virtual machines, smart televisions, smart watches and other wearable devices, as well as any variation or combination thereof.

Computing device 101 may be implemented as a single apparatus, system, or device or may be implemented in a distributed manner as multiple apparatuses, systems, or devices. Computing device 101 includes, but is not limited to, processing system 102, storage system 103, software 105, communication interface system 107, and user interface system 109. Processing system 102 is operatively coupled with storage system 103, communication interface system 107, and user interface system 109.

Processing system 102 loads and executes software 105 from storage system 103. Software 105 includes operating system 111 and applications 113. Applications 113 includes dialer application 115, contacts application 117, and contact-note application 119, which implements contact-note process 200.

When executed by processing system 102 to enhance contact-note capabilities, software 105 directs processing system 102 to operate as described herein for at least the various processes, operational scenarios, and sequences discussed in the foregoing implementations. Computing device 101 may optionally include additional devices, features, or functionality not discussed for purposes of brevity.

Referring still to FIG. 1, processing system 102 may comprise a micro-processor and other circuitry that retrieves and executes software 105 from storage system 103. Processing system 102 may be implemented within a single processing device, but may also be distributed across multiple processing devices or sub-systems that cooperate in executing program instructions. Examples of processing system 102 include general purpose central processing units, application specific processors, and logic devices, as well as any other type of processing device, combinations, or variations thereof.

Storage system 103 may comprise any computer readable storage media readable by processing system 102 and capable of storing software 105. Storage system 103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 103 may also include computer readable communication media over which at least some of software 105 may be communicated internally or externally. Storage system 103 may be implemented as a single storage device, but may also be implemented across multiple storage devices or sub-systems co-located or distributed relative to each other. Storage system 103 may comprise additional elements, such as a controller, capable of communicating with processing system 102 or possibly other systems.

Software 105 may be implemented in program instructions and among other functions may, when executed by processing system 102, direct processing system 102 to operate as described with respect to the various operational scenarios, sequences, and processes illustrated herein. For example, software 105 may include program instructions for implementing contact-note applications.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 105 may include additional processes, programs, or components, such as operating system software or other application software, in addition to or that include contact-note process 200. Software 105 may also comprise firmware or some other form of machine-readable processing instructions executable by processing system 102.

In general, software 105 may, when loaded into processing system 102 and executed, transform a suitable apparatus, system, or device (of which computing device 101 is representative) overall from a general-purpose computing system into a special-purpose computing system customized to facilitate contact-note applications. Indeed, encoding software 105 on storage system 103 may transform the physical structure of storage system 103. The specific transformation of the physical structure may depend on various factors in different implementations of this description. Examples of such factors may include, but are not limited to, the technology used to implement the storage media of storage system 103 and whether the computer-storage media are characterized as primary or secondary storage, as well as other factors.

For example, if the computer readable storage media are implemented as semiconductor-based memory, software 105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 109 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 109. In some cases, the input and output devices may be combined in a single device, such as a display capable of displaying images and receiving touch gestures. The aforementioned user input and output devices are well known in the art and need not be discussed at length here.

User interface system 109 may also include associated user interface software executable by processing system 102 in support of the various user input and output devices discussed above. Separately or in conjunction with each other and other hardware and software elements, the user interface software and user interface devices may support a graphical user interface, a natural user interface, or any other type of user interface.

Communication between computing device 101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1. A computing device comprising: one or more computer readable storage media; a processing system operatively coupled with the one or more computer readable storage media; and a contact-note application stored on the one or more computer readable storage media and comprising program instructions that, when read and executed by the processing system, direct the processing system to at least: receive notifications of phone call events that occur in association with a phone call application running on the computing device; when a notification is received of a phone call event occurring in association with a phone call, identify a contact associated with the phone call and surface a prompt over a user interface to the phone call application to enter a user interface to the contact-note application; and when the prompt is selected by a user, surface a user interface to the contact-note application that comprises a view of a note associated with the contact.

Example 2. The computing device of Example 1 wherein the phone call event comprises one of an end of the phone call, receiving an incoming phone call, and placing an outgoing phone call.

Example 3. The computing device of Examples 1-2 wherein the note comprises a new note descriptive of the phone call, and wherein the view of the note includes an option to save the new note.

Example 4. The computing device of Examples 1-3 wherein the note comprises a previous note descriptive of a previous phone call associated with the contact.

Example 5. The computing device of Examples 1-4 wherein the program instructions further direct processing system to capture connection details of the phone call in the note.

Example 6. The computing device of Examples 1-5 wherein the program instructions further direct the processing system to capture contextual details of the phone call in the note.

Example 7. The computing device of Examples 1-6 wherein to capture the contextual details of the phone call in the note, the program instructions direct the processing system to surface contextual suggestions in the view of the note, receive a selection of a one of the contextual suggestions, and store the one of the contextual suggestions in the note.

Example 8. The computing device of Examples 1-7 wherein the view of the note includes a share option to share the note with other users.

Example 9. The computing device of Examples 1-8 wherein the view of the note includes contact information for the contact and notes associated with the contact.

Example 10. The computing device of Examples 1-9 further comprising a contact application stored on the one or more computer readable storage media and that manages the contact information, wherein the program instructions direct the processing system to: retrieve notes from a notes database associated with the contact-note application; retrieve contact information from a contacts database associated with the contact-note application; retrieve other contact information from a contacts database associated with the contacts application; and populate the note with at least a portion of the notes, at least a portion of the contact information, and at least a portion of the other contact information.

Example 11. An apparatus comprising: one or more computer readable storage media; a contact-note application stored on the one or more computer readable storage media and comprising program instructions that, when read and executed by a processing system, direct the processing system to at least: receive notifications of phone call events that occur in association with a phone call application; when a notification is received of a phone call event occurring in association with a phone call, identify a contact associated with the phone call and surface a prompt over a user interface to the phone call application to enter a user interface to the contact-note application; and when the prompt is selected by a user, surface a user interface to the contact-note application that comprises a view of a note associated with the contact.

Example 12. The apparatus of Examples 1-11 wherein the phone call event comprises one of an end of the phone call, receiving an incoming phone call, and placing an outgoing phone call.

Example 13. The apparatus of Examples 1-12 wherein the note comprises a new note descriptive of the phone call, and wherein the view of the note includes an option to save the new note.

Example 14. The apparatus of Examples 1-13 wherein the note comprises a previous note descriptive of a previous phone call associated with the contact.

Example 15. The apparatus of Examples 1-14 wherein the program instructions further direct processing system to capture connection details of the phone call in the note and capture contextual details of the phone call in the note.

Example 16. A method of operating a computing device comprising: in a contact-note application running on the computing device, receiving notifications of phone call events that occur in association with a phone call application; when a notification is received of a phone call event occurring in association with a phone call, the contact-note application identifying a contact associated with the phone call and surfacing a prompt over a user interface to the phone call application to enter a user interface to the contact-note application; and when the prompt is selected by a user, the contact-note application surfacing a user interface to the contact-note application that comprises a view of a note associated with the contact.

Example 17. The method of Example 16 wherein the phone call event comprises one of an end of the phone call, receiving an incoming phone call, and placing an outgoing phone call.

Example 18. The method of Examples 1-17 wherein the note comprises a new note descriptive of the phone call, and wherein the view of the note includes an option to save the new note.

Example 19. The method of Examples 1-18 wherein the note comprises a previous note descriptive of a previous phone call associated with the contact.

Example 20. The method of Examples 1-19 further comprising the contact-note application capturing connection details of the phone call in the note and capturing contextual details of the phone call in the note.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing device comprising:
    one or more computer readable storage media;
    a processing system operatively coupled with the one or more computer readable storage media; and
    a contact-note application stored on the one or more computer readable storage media and comprising program instructions that, when read and executed by the processing system, direct the processing system to at least:
    receive notifications of phone call events that occur in association with a phone call application running on the computing device, the phone call events comprising the initiation of an outgoing call from the computing device;
    when a notification is received of a phone call event occurring in association with a phone call, identify a contact associated with the phone call and surface, based on the received phone call event, a prompt over a user interface to the phone call application to enter a user interface to the contact-note application, wherein the prompt is surfaced contemporaneously with the phone call;
    when the prompt is selected, surface a user interface to the contact-note application, contemporaneously with the phone call, that comprises a view of a note associated with the contact, the note comprising information associated with at least one previous interaction with the contact;
    add, contemporaneously with the phone call, text to the note associated with the contact;
    identify, via processing of the text, a date in the text added to the note; and
    surface a selectable option to add a reminder to a calendar application corresponding to the date.

2. The computing device of claim 1, wherein the prompt comprises a floating overlay over the user interface to the phone call application, the floating overlay comprising at least a portion of the note.

3. The computing device of claim 1 wherein the note comprises a new note descriptive of the phone call, and wherein the view of the note includes an option to save the new note.

4. The computing device of claim 3 wherein the note comprises a previous note descriptive of a previous phone call associated with the contact.

5. The computing device of claim 1 wherein the program instructions further direct processing system to capture connection details of the phone call in the note.

6. The computing device of claim 5 wherein the program instructions further direct the processing system to capture contextual details of the phone call in the note.

7. The computing device of claim 6 wherein to capture the contextual details of the phone call in the note, the program instructions direct the processing system to surface contextual suggestions in the view of the note, receive a selection of a one of the contextual suggestions, and store the one of the contextual suggestions in the note.

8. The computing device of claim 1 wherein the view of the note includes a share option to share the note with other users.

9. The computing device of claim 1 wherein the view of the note includes contact information for the contact and notes associated with the contact.

10. The computing device of claim 9 further comprising a contacts application stored on the one or more computer readable storage media and that manages the contact information, wherein the program instructions direct the processing system to:
retrieve notes from a notes database associated with the contact-note application;
retrieve contact information from a contacts database associated with the contact-note application;
retrieve other contact information from a contacts database associated with the contacts application; and
populate the note with at least a portion of the notes, at least a portion of the contact information, and at least a portion of the other contact information.

11. An apparatus comprising:
one or more computer readable storage media;
a contact-note application stored on the one or more computer readable storage media and comprising program instructions that, when read and executed by a processing system, direct the processing system to at least:
receive notifications of phone call events that occur in association with a phone call application, the phone call events comprising the initiation of an outgoing call;
when a notification is received of a phone call event occurring in association with a phone call, identify a contact associated with the phone call and surface, based on the received phone call event, a prompt over a user interface to the phone call application to enter a user interface to the contact-note application, wherein the prompt is surfaced contemporaneously with the phone call;
when the prompt is selected, surface, contemporaneously with the received phone call event, a user interface to the contact-note application that comprises a view of a note associated with the contact, the note comprising information associated with at least one previous interaction with the contact;
add, contemporaneously with the phone call, text to the note associated with the contact;
identify, via processing of the text, a date in the text added to the note; and
surface a selectable option to add a reminder to a calendar application corresponding to the date.

12. The apparatus of claim 11 wherein the prompt comprises a floating overlay over the user interface to the phone call application, the floating overlay comprising information associated with at least one previous interaction with the contact.

13. The apparatus of claim 11 wherein the note comprises a new note descriptive of the phone call, and wherein the view of the note includes an option to save the new note.

14. The apparatus of claim 13 wherein the note comprises a previous note descriptive of a previous phone call associated with the contact.

15. The apparatus of claim 11 wherein the program instructions further direct processing system to capture connection details of the phone call in the note and capture contextual details of the phone call in the note.

16. A method of operating a computing device comprising:
in a contact-note application running on the computing device, receiving notifications of phone call events that occur in association with a phone call application, the phone call events comprising the initiation of an outgoing call from the computing device;
when a notification is received of a phone call event occurring in association with a phone call, the contact-note application identifying a contact associated with the phone call and surfacing, contemporaneously with the phone call event, a prompt over a user interface to the phone call application to enter a user interface to the contact-note application, wherein the prompt is surfaced contemporaneously with the phone call;
when the prompt is selected, the contact-note application surfacing a user interface to the contact-note application, contemporaneously with the phone call, that comprises a view of a note associated with the contact, the note comprising information associated with at least one previous interaction with the contact;
adding, contemporaneously with the phone call, text to the note associated with the contact;
identifying, via processing of the text, a date in the text added to the note; and
surfacing a selectable option to add a reminder to a calendar application corresponding to the date.

17. The method of claim 16 wherein the prompt comprises a floating overlay over the user interface to the phone call application, the floating overlay comprising information associated with at least a portion of the note.

18. The method of claim 16 wherein the note comprises a new note descriptive of the phone call, and wherein the view of the note includes an option to save the new note.

19. The method of claim 18 wherein the note comprises a previous note descriptive of a previous phone call associated with the contact.

20. The method of claim 16 further comprising the contact-note application capturing connection details of the phone call in the note and capturing contextual details of the phone call in the note.

* * * * *